Dec. 17, 1940. W. J. MILLER Re. 21,663

APPARATUS FOR THE MANUFACTURE OF ARTICLES FROM PLASTIC MATERIALS

Original Filed Jan. 26, 1927 2 Sheets-Sheet 1

INVENTOR:
William J. Miller
BY Israel Benjamins,
ATTORNEY

Dec. 17, 1940. W. J. MILLER Re. 21,663

APPARATUS FOR THE MANUFACTURE OF ARTICLES FROM PLASTIC MATERIALS

Original Filed Jan. 26, 1927 2 Sheets-Sheet 2

INVENTOR:
William J. Miller
BY Israel Benjamins,
ATTORNEY

Reissued Dec. 17, 1940 Re. 21,663

UNITED STATES PATENT OFFICE 21,663

APPARATUS FOR THE MANUFACTURE OF ARTICLES FROM PLASTIC MATERIALS

William J. Miller, Swissvale, Pa.

Original No. 2,160,484, dated May 30, 1939, Serial No. 14,447, April 3, 1935, which is a substitute for abandoned application Serial No. 163,740, January 26, 1927. Application for reissue September 7, 1940, Serial No. 355,872

19 Claims. (Cl. 25—2)

My invention relates to improvements in the manufacture of articles from plastic materials, particularly in the art of making pottery, and it consists in the novel features which are hereinafter more fully described; it also contains subject matter disclosed in my mechanism for conveying mold carriers, which is described in my co-pending application for patent therefor, Serial Number 14,446, filed April 3, 1935.

This application is a substitution for application 163,740, filed January 26, 1927.

This invention has to do with the manufacture of semi-vitreous or vitreous clay ware, particularly such articles as plates, saucers, cups, bowls, etc., from plastic clay commonly known as dinnerware and heretofore manually jiggered on a conventional potter's wheel.

The objects of my invention are, to provide a horizontal conveyor for moving mold carriers through a fabricating plant comprising feeders of material on to molds, to form a charge thereon, for having the same shaped into ware, preforming tools, for initially and partly shaping the charge, preliminary to having said charge shaped by jiggers, and one or more jiggers for finally shaping said charge; to provide a perfected mechanism for automatically removing and transferring carriers from the jiggers or from a horizontal conveyor which is adjacent to the jiggers and loading them on to an endless conveyor having thereon multiple winding branches, to convey the carriers through suitable treating chambers, such as dryers, etc.; to provide an automatic unloading means for the carriers from the last mentioned conveyor; to transfer the carriers from the last mentioned endless conveyor to a horizontal conveyor, to pass them through an apparatus for printing designs or ornaments on the ware after it is dried and through various other operations such as smoothing, swabbing, etc.; to have the mold carriers readily replaceable for repairs and inspection without stopping the operation of the machine; to provide another endless conveyor for removing the carriers after the ware has been emptied therefrom, and convey them to the first mentioned horizontal conveyor of a fabricating plant, to have material fed to the molds, thereby repeating the cycle of operations, which has been hereinbefore described; to eliminate the guide bars, which are described in my aforesaid co-pending application; to have my mechanism for conveying mold carriers simple, durable and inexpensive.

Figure 1:
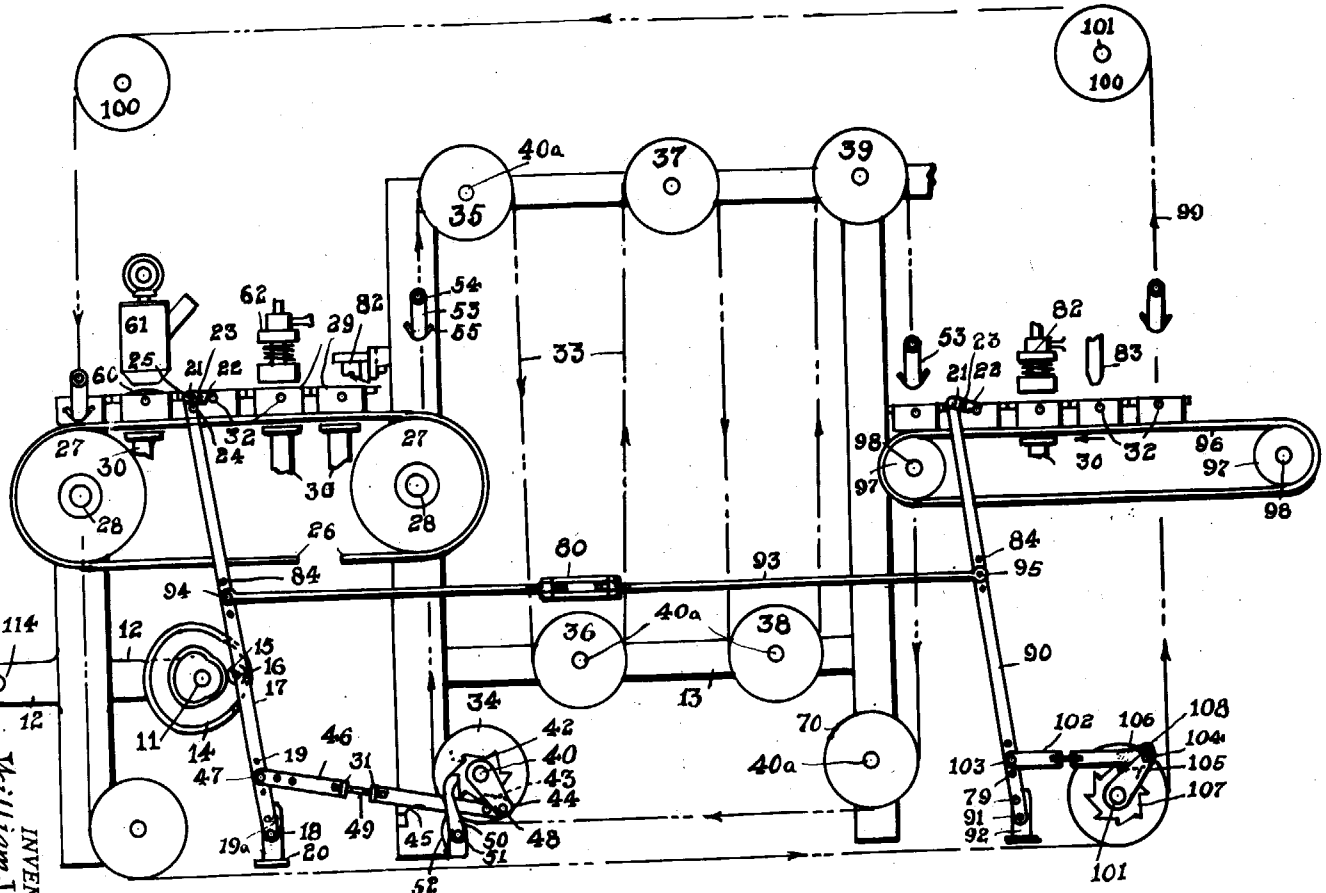
Figure 1 is a diagrammatic side elevation of my mechanism for conveying mold carriers, showing an improved means for loading and unloading mold carriers onto and off a vertical branch of an endless conveyor. It is also a diagrammatical view of a complete conveying system of a fabricating plant in connection with the sundry tools of the same.

11 designates a power shaft, shown in Figure 1 as revolvably mounted on a bracket 12, extension on the frame 13 of the machine.

A positive cam 14 is adjustably secured to shaft 11 by means of a set screw, in contact with a roll 15, pivotally connected by means of a pin 16 to one of a pair of oscillating arms 17; the latter are adjustably secured to a spindle 18, revolvably mounted in interchangeable openings 19a in bearings 20.

Multiple openings 19 are provided at the lower ends of arms 17; some of these openings 19 are situated opposite openings 19a in bearings 20, and serve to vary the position of spindle 18 with relation to arms 17 and bearings 20, thereby varying and adjusting the angle of oscillation of arms 17.

The upper ends of arms 17 have each pivotally connected thereto by means of a pin 25 an extensible latch 21, 22, which consists of two parts; 21 and 22 adjustably connected to each other by a screw thread 23 on part 21 and a corresponding threaded opening in part 22.

A stop 24 on each of said arms 17 limits the drop of said latches 21—22.

A horizontal flexible conveyor 26 is shown in Figure 1 as carried by drums 27, revolvably mounted by means of spindles 28 on frame 13.

Conveyor 26 may consist of either one wide belt, provided with openings therein, for chucks of reciprocating jiggers to pass therethrough, or of a pair of narrow belts or chains, spaced same distance apart from each other, for the same purpose.

The extensible latches 21, 22 may be employed for engaging trunnions 32 on mold carriers 29, intermittently to propel the latter with conveyor 26 from left to right in Fig. 1; carriers 29 rest on the conveyor by gravity and carry it along therewith by friction when carriers 29 are moved by said latches 21—22 as hereinbefore described.

The conveyor 26 is employed to support the mold carriers 29 and the latter are conveyed thereon as above described to feeders 61, employed to apply a charge of material 59 to molds 68 such as described in my United States Letters Patent No. 1,703,316; from the feeders 61 the mold carriers 29 may be conveyed by conveyor 26 to any other tools or devices, such as preforming dies or tools 62, which intially spread and shape the charge of material 29 on the molds 68 preliminary to said charge being finally shaped by jiggers 30, as described in my United States Letters Patent No. 1,769,528.

From said preforming tools 62 the mold carriers 29 are conveyed by conveyor 26 to one or more jiggers 30, to have the material on the molds shaped by the jiggers, as described in my United States Letters Patent No. 1,757,132.

The carriers 29 may be brought on conveyor 26 intermittently to be moved into position over jigger 30 by means of latches 21—22 and trunnions 32 on the sides of said carriers 29, substantially as described in my aforesaid co-pending application, except that the carriers 29 may be moved along with said conveyor 26 on which they rest by friction.

Fig. 1 discloses flexible members or chains, forming a conveyor 33, disposed in parallel vertical planes and engaged by pulleys or sprockets 34, 35, 36, 37, 38, 39, and 78 which are adjustably secured to shafts 40, and 40*a* revolvably supported by bearings on frame 13. The adjustment of the pulleys or sprockets on their shafts enables the maintenance of the alignment of the chain hooks 53 on and prevents the accumulation of slack in any one part of the same.

The sprocket bearings may also be adjustable heightwise to take up the slack in the chains 33.

A ratchet 42 is secured to shaft 40 Fig. 1 for intermittent actuation by a pawl 43, pivotally connected to a link or strap 44, swivelled on shaft 40 the teeth of the ratchet are preferably spaced to move the chains 33 a distance equal to the space between two successive hooks thereon.

A plate spring 45, secured at one end to strap 44 presses with the other end on pawl 43, to keep the latter in engagement with ratchet 42, to turn shaft 40 intermittently and actuate conveyor 33.

An adjustable connecting rod 46 is pivotally connected at one end to one of the arms 17 by a pin 47 located in one of the openings 19 in arms 17 and at the other end by means of a pin 48 to the end of strap 44.

The pin 48 may also be employed for pivotally connecting pawl 43 to strap 44, if desired.

The connecting rod 46 serves to transmit motion from arms 17 to ratchet 42 and shaft 40, Fig. 1 and consists of two parts with flanges 31 adjustably connected to each other by means of a turn-buckle 49, for varying and adjusting the position of strap 44 with the pawl 43 thereon with relation to sprocket 35, thereby varying and adjusting the position of strap 44 with the pawl 43 thereon with relation to sprocket 35, thereby varying and adjusting the phase of motion of conveyor 33 with relation to arm 17 and the latches 21—22.

The shaft 40 with the ratchet 42 thereon may also be actuated by an oscillating arm and cam, which are independent of arms 17 and cam 14, thereby making the motion of said conveyor 33 independent of the horizontal motion of carriers 29 on conveyor 26.

By means of the arrangement and disposition of parts shown in Fig. 1 the conveyor 33 will be at rest when latches 21—22 will be moving carriers 29 in the direction from left to right in Fig. 1, and carriers 29 will be at rest when conveyor 33 will be in motion as is evident from the drawings.

To keep the ratchet 42 from overhauling or turning back, when the point of unloading of said carriers 29 from conveyor 33 is considerably higher than the point of loading of carriers 29 onto the conveyor 33, I provide a pawl 50 pivotally connected by a pin 51, to the bearing 41 of shaft 40.

A plate spring 52 is secured at one end thereof to bearing 41, the other end engaging pawl 50, to keep it in engagement with ratchet 42.

Hooks 53 pivotally connected by means of spindles 54 to conveyor 33 to move therewith are maintained in the position shown by gravity.

Troughs 55 form extensions of hooks 53, to engage trunnions 32 on carriers 29, as the branches of the chains of conveyor 33 are moving upwardly alongside of trunnions 32. When carriers 29 are lifted by the action of hooks 53 engaging the underside of trunnions 32, they are carried by conveyor 33 to any required destination, such as drying chambers, to be unloaded at a point (Fig. 1) situated at an elevation with relation to the conveyor 26 which is sufficiently high to prevent overrunning of the conveyor 33 on sprockets under the influence of gravity.

When the point of unloading of carriers from conveyor 33 is considerably higher than the point of loading of the carriers onto said conveyor 33, the tendency of conveyor 33 may be to overhaul or turn back, which tendency will be counteracted by said pawl 50.

The direction of the motion of said flexible members or chains 33 is indicated by arrows in Fig. 1.

Another horizontal conveyor 96 is carried by drums 97, mounted on spindles 98, pivotally connected to frame 13.

The conveyor 96 intercepts carriers 29 from downwardly moving hooks 53 on an adjacent branch of said chain conveyor 33, to pass them through suitable tools, such as a printing tool 82*a* and under a blast pipe 83 or to and through such device as hereinbefore mentioned for swabbing, sponging, finishing, etc., the ware as described in my United States Letters Patent No. 1,751,049.

The endless conveyor 33 and the hooks 53 thereon continue in their cycle of motions picking up mold carriers from the conveyor 26 and depositing the same onto the conveyor 96 after having conveyed the mold carriers through any required treating chambers, such as dryers.

When the carriers 29 are to be unloaded from conveyor 33 at some point, which is situated at a considerably lower level than conveyor 26, the conveyors 33 may tend to overrun, when the friction of the chains is insufficient to balance gravity of the carriers, the ratchet 42 with the pawls 43 and 50 may then be aided by positive clutches, if desired.

The tendency to overrun in the above case may also be overcome by adjustable pressure friction brakes applied to the sprockets of conveyor 33 or to auxiliary pulleys on one of the sprocket shafts 40 or spring 52, may also be made powerful enough to cause pawl 50 to act as a one way brake on ratchet 42.

Another pair of oscillating arms 90 is pivotably connected by means of a spindle 91 in multiple interchangeable openings 79 in arms 90 to stationary bearings 92, which also have multiple openings 79 therein; and arms 90 are actuated by means of a connecting rod 93, which consists of two sections, adjustably connected to each other by means of a turnbuckle 80. The rod 93 is shown in Fig. 1 as pivotally connected at one end to one of the arms 17 by means of a pin 94 and at the other end to one of the arms 90 by a pin 95 and interchangeable openings 84 in one or both arms 90.

Extensible latches 21—22 are pivotally connected to the upper ends of arms 90, to act on trunnions 32 of mold carriers 29, situated on conveyor 96, to move mold carriers through any additional tools, such as a printing apparatus 82*a* and a blast pipe 83, Fig. 1, thereupon, to bring them, with the trunnions 32 thereon, within reach of hooks 53, pivotally connected to another pair of endless flexible conveyor chains 99, carried by drums or sprockets 100; secured to shafts 101.

The finished ware is removed from the molds in any suitable manner, and the carriers 29 with the molds thereon are conveyed by conveyor chains 99 in the direction indicated by the arrows, Fig. 1 and deposited onto the horizontal conveyor 26, thereby completing the cycle of operations.

The flexible conveyor chains 99 are actuated by a connecting rod 102 of adjustable length, as shown, which is pivotally connected to one of arms 90 by pin 103 located in one of interchangeable openings 79 in arms 90, and to a link 105 by pin 104, the strap being swivelled on one of said shafts 101.

A pawl 106 pivotally connected to link 105 intermittently engages a ratchet 107, secured to shaft 101 adjacent to strap 105. A plate spring 108 maintains pawl 106 in engagement with ratchet 107. The spring 108 may be secured to link 105 and engage pawl 106. A brake may be provided to prevent either overrunning or overhauling of said chains 99.

The shaft 101 with the ratchet 107 thereon may also be actuated by an oscillating arm and cam which are each independent of arms 90 and cam 14 if desired thereby making the motion of said conveyor 99 independent of the horizontal motion of carriers 29 on conveyor 96.

Optionally, other means for moving conveyors 33 and 93 may be employed, and, if desired, a conveyor other than a chain conveyor employed. The hooks 53 may be replaced by other engaging members, or the shape of the hooks changed. The conveyors 33 and 99 may also be otherwise than vertical, and the support for the carriers 29 may be otherwise than horizontal, if desired, also, the horizontal conveyors 26 and 96 may be omitted, and the mold carrier 29 fed to stationary tracks.

Figure 2:
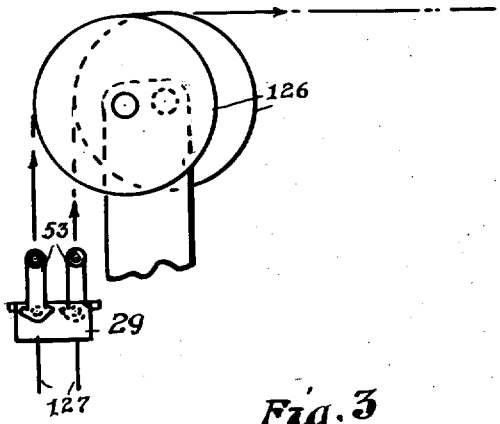
Figure 2 is a fragmentary detail view showing the application of the loading and unloading means of my mechanism for conveying mold carriers to diagonally suspended conveying trays or pallets.

In the modifications shown in Fig. 2 hooks 53 are connected to flexible members 127 engaged by pulleys or sprockets 126, situated in parallel to each other and in the same horizontal plane, but not in alignment.

By these means, diagonally hung mold carriers or pallets may be supported by the chains 127 and hooks 53 or other connecting means may be employed in connection with the chains 127 in the same way as with the chains 33 or 99.

Figure 3:
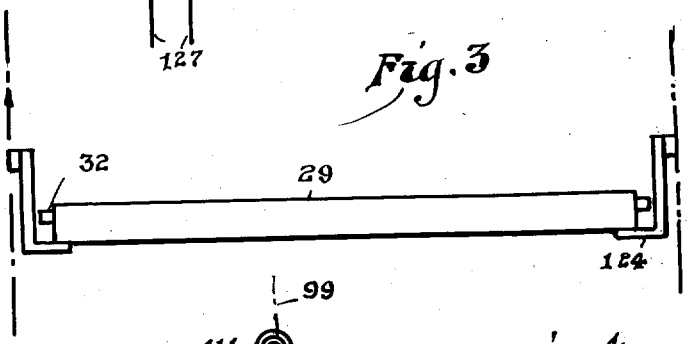
Figure 3 is a fragmentary detail view of another form of loading means, which forms part of my mechanism for conveying mold carriers.

In the modification, shown in Fig. 3, angular stirrups 124 instead of hooks 53 support mold carriers 29. Trunnions 125 are also provided on the stirrups for pivotally connecting the latter to chains 33 or 99. The carriers 29 may also be deposited by the stirrups 124 on to a horizontal conveyor in the same way as by hooks 53.

Figure 4:
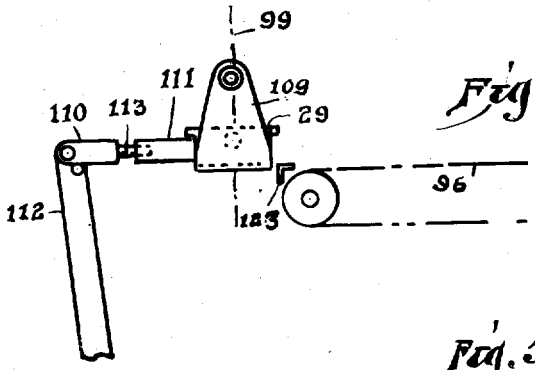
Figure 4 is a fragmentary side view of a detail of a modification of a part of my mechanism for conveying mold carriers, which is hereinafter described.
Figure 5:
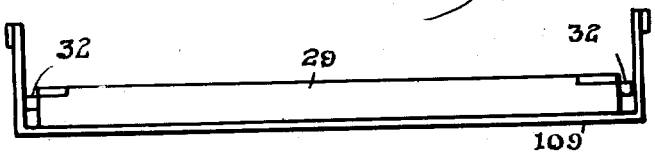
Figure 5 is an end view of the tray or pallet which is shown in Figure 4.
Figure 6:
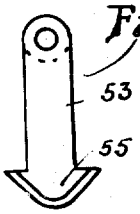
Figures 6 and 7 are detail views of a conveyor hook.
Figure 7:
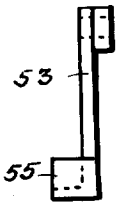

In modification shown in Figs. 4 and 5, I provide a set of stirrup shaped hangers 109 to support the carriers 29. The hangers 109 may be permanently and rotatively connected to chains 33 or 99 and the carriers 29 moved off the hangers 109 and onto conveyor 96 by one or more extensible push blocks 110, 111, Fig. 4, adjustably connected to each other by a thread 113 and pivotally connected to a pair of oscillating arms 112, which may replace arms 90 and be placed with their bearings 92 forwardly of conveyor 96, or to the left in Fig. 1, and be actuated by connecting rod 93, as described.

A platform 123 is provided at one end of conveyor 96 for receiving carriers 29 from hangers 109 to pass them on to conveyor 96 as shown in Fig. 4. When the hangers 109 are employed on chain 33, the arms 112 may then replace the arms 17 and be placed forwardly of the conveyor 26. The power shaft 11 with the cam 14 thereon may be journaled as at 114 in bracket 12 forwardly of its position when actuating the arms 17.

Mold carrier trunnions 32 in Figs. 4 and 5, adapt the carriers 29 to a system of conveying as shown in Fig. 4 to a system as shown in Fig. 1.

Many other changes may be made in the details of my mechanism for conveying mold carriers without departing from the main scope of my invention.

I do not, therefore, restrict myself to the details as shown in the drawings; but I intend to include also all mechanical equivalents and obvious modifications of the same within the scope of my invention.

The present application provides for a system of manufacture of dinnerware from clay mass to finished ware ready for the bisque kiln. The molds, which are of the absorbent type normally used in the manual production of pottery ware are arranged on the carriers in side by side and definite positioned relation, the carriers being opened and apertured in their bases to permit the elevating chucks at the feeding, forming and other stations to engage the molds on their bottoms and raise the same into co-operation with the particular instrument or instrumentalities. Accordingly, when a carrier loaded with empty molds is deposited on belt 26 and advanced to the extruding pug mold 61, the carrier is halted whilst the multiple chucks 30 raise all of the molds simultaneously for the reception of a charge of material, the transverse parallel alinement of the carriers as in the dryer, being preserved whilst the carriers are moved through the automatic pottery ware fabricating machine. In short, the installation permits of the establishment of a number of parallel production lines extending from the pug through the various other fabricating and drying stations and around to the pug, the molds circulating in repeated cycles without displacement except where required incidental to fabricating operations.

Wheresoever the term "dinnerware" shall occur in the appended claims, it shall mean that class of ware such as plates, cups, saucers, etc. as distinguished from the products of the coarser clay ware arts, viz: bricks, tile, flower pots, etc. Also, wheresoever the term "mold" or "molds" is employed in the appended claims it shall be understood that the same shall refer to flatware and/or hollow ware molds.

I claim:

1. In apparatus for the manufacture of potteryware, in combination, a fabricating machine provided with means for fabricating more than one piece of ware at a time, conveying means for empty molds located adjacent thereto, means for removing molds from said conveying means and transferring the same to said fabricating means, and means for replacing filled molds on said conveying means.

2. In a mechanism for conveying mold carriers, diagonally hung mold carriers, pairs of trunnions thereon, which have their axes parallel, one trunnion on each carrier being advanced in position with relation to the other trunnion thereon, a flexible member disposed in parallel vertical planes, rotary members for supporting said flexible members in each of said planes, said rotary members of one plane having their axes advanced in position with relation to the rotary members of the other plane, and hooks, on said members, for picking up and pivotally suspending said trunnions, to convey said carriers to a desired destination.

3. In apparatus for the manufacture of potteryware the combination which comprises, a dryer, a chain conveyor associated therewith, removable mold carriers each adapted to support a plurality of molds associated with said conveyor, a jiggering machine including a multiple of profiling means located adjacent said conveyor, an intermittently operable conveyor associated with said fabricating machine operable in timed relation with the dryer conveyor, means for removing mold carriers from said dryer conveyor and depositing the same on said jiggering machine conveyor in transverse parallel alignment whereby the molds enter and leave the jiggering machine in parallel lines and means for replacing said carriers with filled molds thereon on said dryer conveyor.

4. In apparatus for the manufacture of potteryware the combination which comprises, a dryer, a conveyor associated therewith, a jiggering machine located adjacent said conveyor, a plurality of trunnioned mold carriers attached to said conveyor and arranged in transverse parallel alignment, means for removing said mold carriers in consecutive order from said conveyor, a conveyor associated with said jiggering machine for receiving said carriers and travelling the same in transversely spaced relation therethrough and means engageable with the trunnions of the mold carriers for reconnecting said mold carriers in original transverse alignment to said dryer conveyor.

5. In apparatus for the manufacture of potteryware the combination which comprises, a dryer, a jiggering machine associated with said dryer and a printing machine located adjacent said dryer, a conveyor associated with said dryer, mold carriers detachably associated with said conveyor, means for automatically transferring mold carriers from said dryer conveyor to said jiggering machine and said printing machine and means for retransferring said carriers to the dryer conveyor.

6. In apparatus for the manufacture of potteryware, a pair of pottery machines located in spaced relation comprising a fabricating machine and a printing machine, a conveyor associated with each of said machines, a dryer common to both machines, a mold conveyor in said dryer common to said machines, drive mechanism for operating the conveyor of both said machines and said dryer conveyor in timed relation and a mold carrier removably associated with all of said conveyors for transporting molds and ware therebetween.

7. In apparatus for the manufacture of potteryware, the combination which comprises, a dryer, an endless conveyor operating therein, a plurality of mold carriers attached to said conveyor, a printing machine located adjacent said conveyor, a horizontal conveyor associated with said printing machine and adapted to receive the carriers supported by said dryer conveyor, said carriers being adapted to be passed through said machine by said horizontal conveyor and means for operating said horizontal conveyor and said dryer conveyor in timed relation.

8. In apparatus for the manufacture of potteryware, a dryer, a mold conveyor operating therein, carriers detachably associated with said conveyor, a ware fabricating machine, a conveyor associated with said ware fabricating machine and having one end thereof so disposed as to intercept the carriers associated with said dryer conveyor, means for actuating said conveyor associated with said fabricating machine to travel detached carriers away from said dryer conveyor and into said fabricating machine, said carriers being subsequently reattached to said dryer conveyor subsequent to travel through said fabricating machine.

9. Apparatus for the manufacture of potteryware comprising, in combination, a pottery fabricating machine and a pottery printing machine, a dryer having a chain conveyor for molds, means for transferring empty molds from said printing machine to said fabricating machine, conveying means for travelling molds through said fabricating machine operable in the loading of molds onto said chain conveyor, conveying means for travelling molds through said printing machine operable in the unloading of molds from said chain conveyor, mechanism for driving each of said conveying means and means associated with said mechanism for varying the travel of said conveying means.

10. In apparatus for the manufacture of jiggered potteryware, in combination, a fabricating machine provided with means for fabricating more than one piece of ware at a time, a dryer having a chain conveyor therein arranged in vertical courses with mold bearing trays supported between the chains of said conveyor, means for removing molds, a tray load at a time, from the chain conveyor in the dryer takeout position, a conveyor associated with said fabricating machine adapted to receive the said molds and convey the same to the fabricating machine and means for loading filled molds, a tray load at a time, onto the dryer conveyor.

11. In apparatus for the manufacture of potteryware, a dryer having a chain conveyor for molds, a fabricating machine located at the mold entrance end of the dryer, a printing machine with conveying means located at the ware takeout end of said dryer, means for loading ware from the dryer onto the said printing machine, conveying means, intermittently operable means for loading empty molds onto the fabricating machine and means for loading molds onto the dryer conveyor.

12. In apparatus for the manufacture of potteryware, the combination which comprises, an automatic jigger capable of forming diverse or similar articles of potteryware in multiple from plastic ceramic material, a dryer for extracting moisture from the ware thus produced said dryer having a ware conveyor associated therewith for transporting said articles of ware therethrough to an unloading point, a conveyor located adjacent the unloading point for transporting ware therefrom, and mechanism for applying ornament to said ware associated with said last named conveyor, the ware being swabbed and smoothed after it leaves the dryer.

13. In apparatus for the manufacture of potteryware, the combination which comprises, a multiple line automatic jiggering machine for forming articles of potteryware in multiple and in diverse or similar shapes and forms, a dryer for extracting moisture from the ware thus produced, a conveyor for transporting ware from the jigger through the dryer in spaced line of production to an emptying point, a conveying mechanism disposed adjacent the unloading point for transporting lines of ware therefrom, and mechanism for applying designs or ornament to the ware associated with said last named conveying mechanism, the ware being swabbed and smoothed after said ware leaves the dryer.

14. In apparatus for the manufacture of potteryware, the combination which comprises, an automatic jigger, a dryer, a conveyor for transporting ware from the jigger to and through the dryer and to an unloading point, a conveyor adjacent the unloading point for transporting ware therefrom, and mechanism for applying designs or ornament to said ware associated with said last named conveyor, and means for operating said dryer conveyor and said last named conveyor in timed relation.

15. In apparatus for the manufacture of potteryware, the combination which comprises, an automatic jigger for forming articles of potteryware from ceramic material, a dryer for extracting moisture from the ware thus produced having a ware conveyor associated therewith for transporting ware from the jigger to and through the dryer to an unloading point, said jigger and said dryer conveyor being synchronously operated, a conveyor located adjacent the ware unloading point for transporting ware therefrom means automatically operable to unload ware from the dryer conveyor and place the same upon the second named conveyor, mechanism for applying design or ornament to the ware associated with said second named conveyor and operable to apply designs or ornament to the ware transported thereon, the ware being swabbed and smoothed after leaving the dryer.

16. In apparatus for the manufacture of potteryware, the combination which comprises, an automatic jigger, a dryer for extracting moisture from the ware produced by said jigger said dryer having a ware conveyor associated therewith for transporting articles of ware therethrough and to an unloading point, means for transporting ware thereaway from and mechanism for applying ornament to the ware associated therewith the ware being swabbed and smoothed subsequent to leaving the dryer.

17. In apparatus for the manufacture of potteryware, the combination which comprises, means for automatically fabricating potteryware in spaced lines of production, a dryer associated therewith through which said ware is progressed in the original lines of production in order to mature the ware and apparatus through which the ware travels subsequent to drying in one or more production lines, said apparatus including one or more means for applying ornament to the ware in one or more production lines.

18. In the manufacture of dinnerware, the method which consists in, advancing one or more lines of molds in repeated closed cycles through a fabricating machine and dryer and automatically fabricating and drying ware on said molds and thereafter progressing said dried ware through an ornamenting unit and, applying ornament thereto said ware remaining in the original lines of production.

19. In apparatus for the manufacture of potteryware, the combination which comprises, means for automatically fabricating potteryware in spaced lines of production, a dryer associated therewith through which said ware is progressed in the original lines of production in order to mature said ware, and printing apparatus through which the ware is conveyed subsequent to drying, the ware pieces being presented thereto in consecutive order in a production line.

WILLIAM J. MILLER.